Patented Aug. 8, 1944

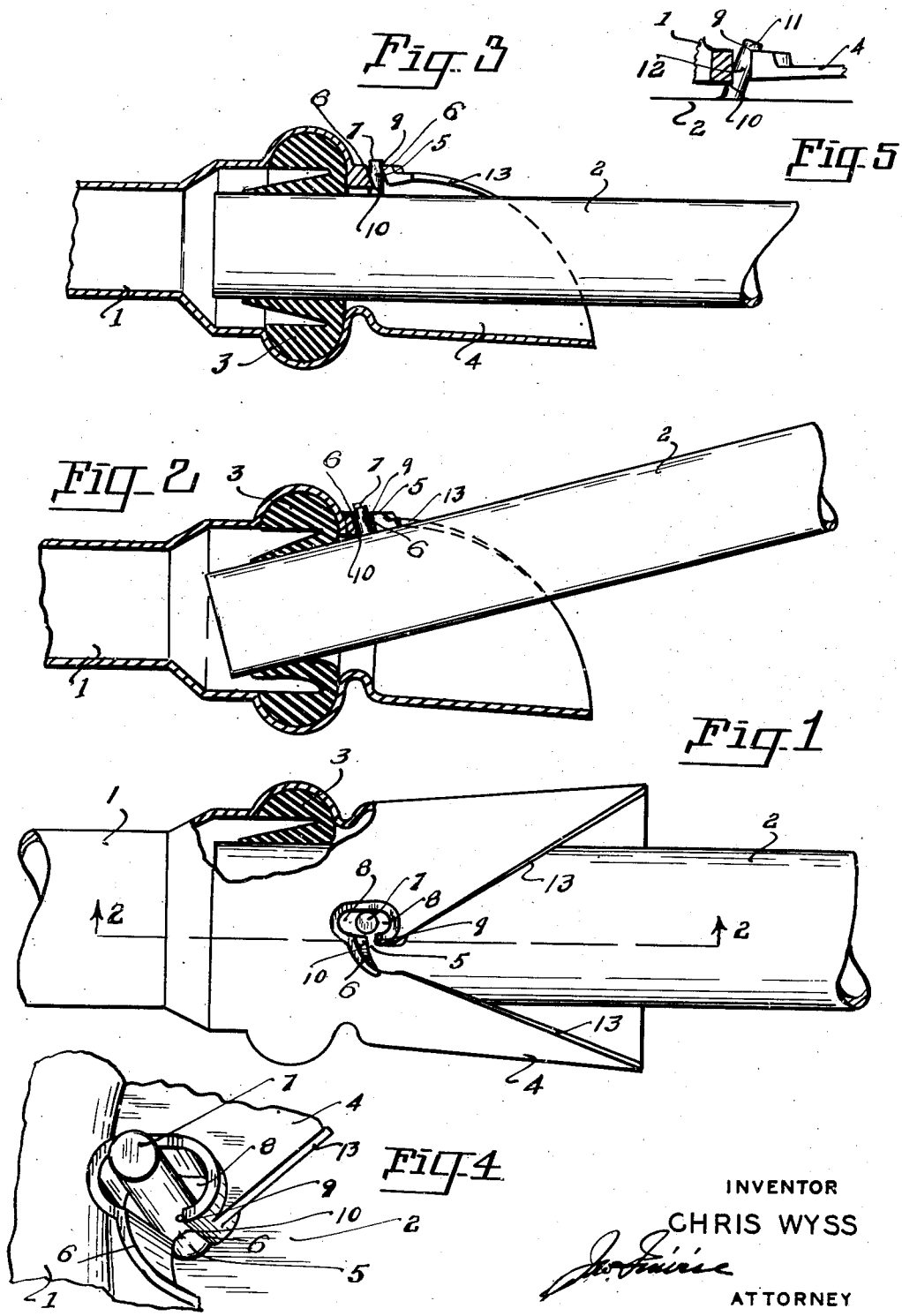

2,355,407

UNITED STATES PATENT OFFICE 2,355,407

LOCK FOR PIPE JOINTS

Chris Wyss, Tillamook, Oreg.

Application April 28, 1943, Serial No. 484,899

1 Claim. (Cl. 285—175)

This invention relates to locks for pipe joints and the primary object of the invention is to provide a bayonet type of lock that will maintain its locked position while the pipe line is in operation.

My new and improved lock consists in forming the entry slot of the female portion of the lock at an angle to the axis of the locking pin passing therethrough.

Another object of my invention is the provision of a recess in the female member longitudinally of the pipe to be joined, this recess extending on either side of the entry slot for assisting in maintaining the pipe joint in locked position.

These and other incidental objects will be apparent in the drawing, specification and claim.

Referring to the drawing:

Figure 1 is a plan view of my new and improved locking device applied to a pipe coupling.

Figure 2 is a sectional view of Figure 1, taken on line 2—2, looking in the direction indicated, illustrating the lock in releasing position.

Figure 3 is similar to Figure 2 except that the lock is shown in locked position, the pipe being illustrated in a straight line position, maintaining the joint in locked position.

Figure 4 is a fragmentary plan perspective view of my new and improved bayonet lock.

Figure 5 is another preferred form of my improved bayonet lock.

In the drawing:

The female end of a pipe joint is illustrated at 1, having a pipe 2 inserted therein through liquid seal 3. This seal is of a well known construction and is admirably adapted to my bayonet lock.

In my new and improved joint, covered by a prior patent, I provided a skirt 4 for guiding the pipe 2 into the pipe 1. In this application I included a bayonet joint lock, but in operation this type of lock became disengaged. In order to prevent the uncoupling of the lock I have provided a slot 5, having side walls 6 formed at an incline or an angle to the axis of the pipe line. The locking pin 7, which is fixedly secured to the pipe 2, is transversely disposed relative to the pipe 2, and in order to enter the slot 5 the pipe 2 must be elevated to the position shown in Figure 2. When the pin 7 has entered the elongated slot 8 of the lock, the pipe is then lowered to the position shown in Figure 3. The upper corner 9 and the lower corner 10 of the slot 5 will then prevent the pin 7 from passing through the side slot 5. This is best illustrated in Figures 3 and 4.

The slot 8 is elongated to permit the free movement of the locking pin 7, and at the same time providing space at either end of the slot 8 for assisting in preventing the pin from passing out through the slot 5.

I have illustrated in Figure 5 another preferred form of improvement carrying out the spirit of my invention, wherein the pin 11 is disposed at an angle to the pipe 2 and the slot 12 being disposed at right angles to the pipe. This method will work equally as well as the one just described.

In the operation of my new and improved pipe joint lock, the pipe 2 is dropped into the skirt 4 and is forced forward. The cam surfaces 13 of the skirt will guide the pin 12 into the slot 5 when the pipe 2 is elevated, as illustrated in Figure 2, permitting the pin 7 to pass into the elongated slot 8, after which the pipe is then lowered to the straight line position as illustrated in Figure 3.

This lock works admirably well in irrigation pipe lines where a simple and easily connected pipe joint is desirable.

I do not wish to be limited to the exact mechanical structure as illustrated, as other forms of embodiment may work equally as well, still coming within the scope of my claim.

What I claim is:

A lock for interfitting pipe sections, including an element carried by one section and a cooperating recess formed in the other section, the element being normal to the axis of one section and the walls defining the entrance to the recess being at an angle other than a right angle to the axis of the other section, whereby the element carrying pipe section must be inclined with respect to the recess-carrying pipe section to a degree to dispose the element at an angle corresponding with that of the recess to permit connection or disconnection of the pipe sections.

CHRIS WYSS.